Jan. 25, 1938. L. C. BROECKER 2,106,673
TIRE AND VALVE STEM
Original Filed April 27, 1933 2 Sheets-Sheet 1

INVENTOR
Lewis C. Broecker
BY
Prindle, Bean & Mann
ATTORNEY

Jan. 25, 1938.　　　　L. C. BROECKER　　　　2,106,673
TIRE AND VALVE STEM
Original Filed April 27, 1933　　2 Sheets-Sheet 2
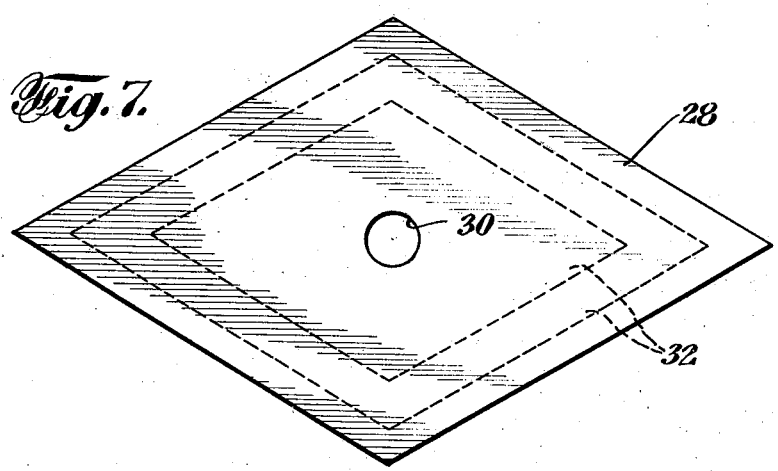
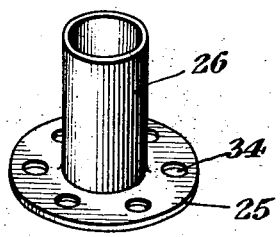
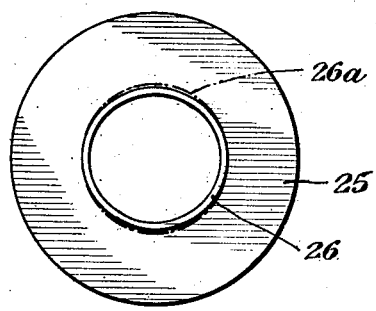
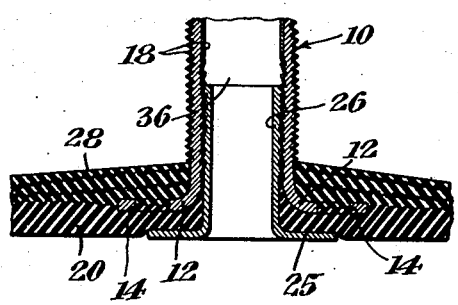
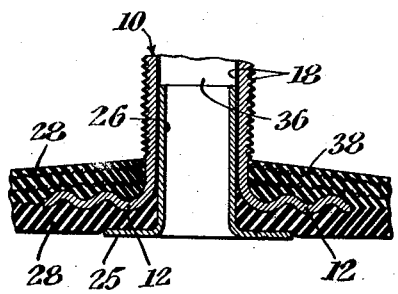
INVENTOR
Lewis C. Broecker
BY
Prindle Bean & Mann
ATTORNEY Patented Jan. 25, 1938

2,106,673

UNITED STATES PATENT OFFICE 2,106,673

TIRE AND VALVE STEM

Lewis C. Broecker, Bridgeport, Conn., assignor to Bridgeport Brass Company, Bridgeport, Conn., a corporation of Connecticut Application April 27, 1933, Serial No. 668,214
Renewed May 11, 1937

4 Claims. (Cl. 152—12)

My invention relates to improvements in methods for securing valve stems to rubber tires, especially inner tubes. The invention also relates to a novel finished article.

One of the difficult problems in connection with the manufacture of inner tubes is to make a joint between the valve stem and the tube itself that will stay absolutely air-tight during the life of the tube. The conventional valve stem depends on the pressure exerted by a nut screwed on the body of the stem, which clamps the wall of the inner tube between a washer and the base of the stem. In practice it is found necessary to tighten this nut periodically to compensate for the shrinkage of the rubber due to ageing. Frequently the leakage due to this shrinkage is very slight, but nevertheless extremely objectionable because, unless the tire is reinflated at frequent intervals, the pressure will be below what it should be most of the time, with the well known disastrous results.

The object of my invention is to eliminate these and other disadvantages and to secure, for example, a valve stem to its inner tube in a simpler and at the same time a better way which makes the union permanent and inherently strong and non-leaking.

I will now describe one preferred method within my invention for securing a valve stem to the inner tube of a pneumatic tire, it being understood that this is put forward in illustration of the invention, but without necessarily limiting it to all the details thereof. In this description I will refer to the accompanying drawings in aid of the description.

In these drawings:

Fig. 7 shows in top plan an unvulcanized patch made of alternate layers of fabric and uncured rubber.

Fig. 8 shows a modification in the bushing.

Fig. 9 is a top plan of another modified bushing.

Fig. 10 is similar to Fig. 6, but shows a modification in the bushing and valve stem to increase the frictional grip therebetween, and Fig. 11 also similar to Fig. 6, shows a modification in the base of the valve stem.

Figure 1:
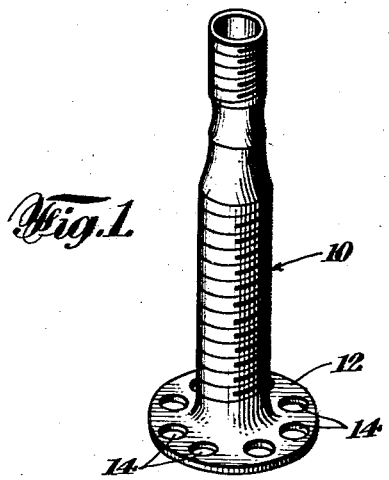
Fig. 1 is a perspective view of one form of a tire valve stem usable in connection with the invention.
Figure 2:
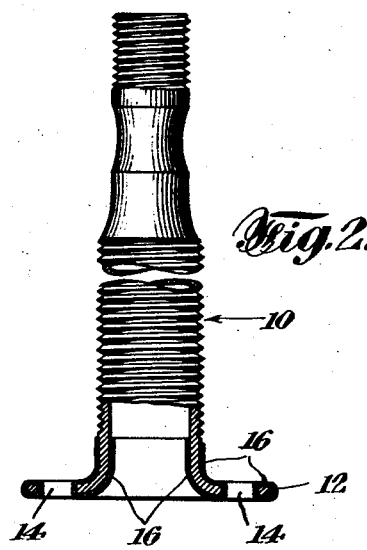
Fig. 2 is a side elevation thereof on a larger scale with the base portion broken away and shown in section to illustrate a rubber coating or the like applied to said base portion.

Proceeding now with the description, Fig. 1 shows a valve stem which is designated in general by the numeral 10, and which may have any ordinary or preferred construction and may be made either by drawing it from sheet metal or it may be machined or otherwise formed. Further, it may be assumed that the valve stem usable with my invention is made of the usual material which is brass; but it may be made of any suitable metal or alloy containing copper or some other metal or combination of metals which will intimately unite or bond with vulcanized rubber.

The base 12 of the stem is shown specially formed with apertures 14 useful with this invention and which may be of any shape suitable to have pressed into them uncured rubber for the purpose which will later appear of more effectively anchoring said base 12 between the pressed together layers of uncured rubber which is subsequently vulcanized.

The initial step of the method is to clean the valve stem by removing all oil, oxidation and the like, down to the bright metal in the manner ordinarily practiced in preparing valve stems for electroplating. Briefly, this comprises removing oil or grease with an alkali bath, rinsing with water to remove the alkali, then treating the valve stems with dilute acid such as nitric acid to remove oxides and the like, down to the bright metal, then rinsing with water to remove the acid. Thus, Fig. 1 is supposed to show for example, a brass valve stem with bright clean surfaces.

The next step is to apply a coating 16 of rubber or other suitable material as hereinafter explained on the base portion of the valve stem, inside and outside, including the base 12. Any convenient way of doing this may be used, such as dipping the base portion of the valve stem into a solution containing rubber or a rubber compound or some other suitable material. The valve stem is then removed from the solution and the solvent allowed or caused to evaporate leaving the coating 16, of the rubber or rubber compound or the like, on the base portion of the valve stem.

Any material is suitable for this coating 16, which will protect the brass base portion from being electroplated during the next step of the method and which after said plating may either be readily removed to expose the bright brass for bonding with vulcanized rubber or which, without being removed, will merge with or be taken up or displaced by the uncured rubber of the inner tube and patch when applied as hereinafter described, so that when said rubber is vulcanized both the tube and patch will bond intimately to the base portion of the valve stem.

Thus, I may form the coating 16 of wax, paraffin, shellac or the like, then electroplate the valve stem which will take the plating only upon the uncoated portions, and then I may dissolve off or otherwise suitably remove the coating 16, or may simply allow it to merge with or be displaced by the uncured rubber of the tube or patch preliminary to or during the vulcanization of the rubber, this latter being on the assumption that the material of the coating is one which will merge or be displaced as aforesaid without interfering with or preventing the strong air-tight bonding between the rubber and the bright metal of the valve stem base by the vulcanizing operation.

As another alternative, the step which produces the coating 16 may be omitted altogether by electroplating the brass valve stem from its free end up to but not including its bright brass base portion; and then promptly, before oxidation can occur, integrating said stem with the rubber tube and patch, etc., in accordance with the method. However, such prompt action is often impractical or inconvenient in actual manufacture, and the valve stems must remain unusued for a considerable time; and it is for this reason that I have devised the coating 16 to enable the vulcanized rubber to bond to the bright brass even after a considerable interval has elapsed between the cleaning and coating of the valve stem base portions and their integration with the rubber tube and patch.

Proceeding now with the next step of the process or method, the valve stem will then be coated, as by electroplating, with nickel or some other suitable metal substantially non-corrodible under ordinary conditions of use.

Figure 3:
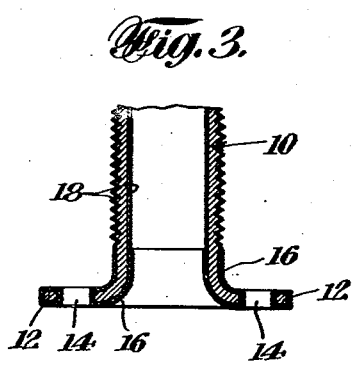
Fig. 3 is a fragmentary longitudinal section of the same valve stem to show a metal coating on all that portion of the valve stem except the aforesaid rubber coated basal portion.

Fig. 3 shows the valve stem after the completion of this step wherein the metallic coating is designated 18 and is shown extending up to but without covering the rubber coating 16 or its equivalent. The coating 16 will ordinarily preferably consist of a material such as rubber which is electrically non-conducting so that even if the entire valve stem be immersed in the electrolytic bath the plating metal will not deposit thereon. However, it will be understood that the valve stems may be electroplated by immersing them in the bath only up to the beginning of their basal portions, if for any reasons such procedure be desirable or necessary.

Figure 4:
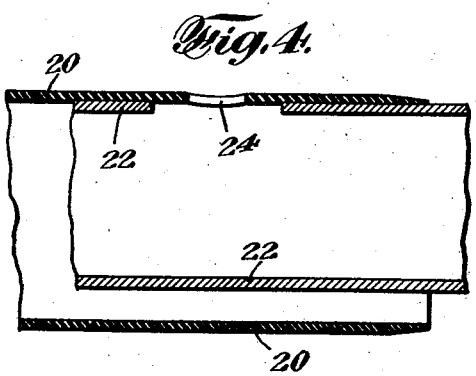
Fig. 4 illustrates in longitudinal section a portion of an uncured inner tube and a support therefor.
Figure 5:
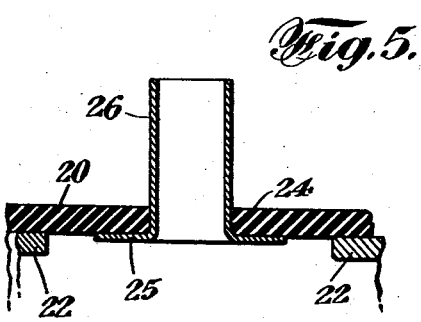
Fig. 5 illustrates the insertion of a bushing used in connection with the invention into the inflation hole in the wall of the tube.

The next step is indicated in Figs. 4 and 5 wherein 20 designates an uncured rubber inner tube of which only a short length or piece at one end thereof is shown in longitudinal section supported temporarily on a hollow bracket 22. A round hole 24 extends through the wall of the tube. Fig. 5 is an enlargement of a portion of Fig. 4 and further shows a flanged bushing 26 projecting outwardly through the hole 24 in the wall of the uncured rubber tube 20. This bushing may be made of thin metal such as brass or other metal or alloy which will bond with vulcanized rubber. In practical manufacturing the bushing is inserted into the position shown in Fig. 5 while the tube is supported on the hollow bracket 22, Fig. 3, by automatic mechanism not necessary to be described to those familiar with the art of mechanically inserting valve stems into uncured inner tubes and up through the hole in the wall of the tubes to receive the stems.

Figure 6:
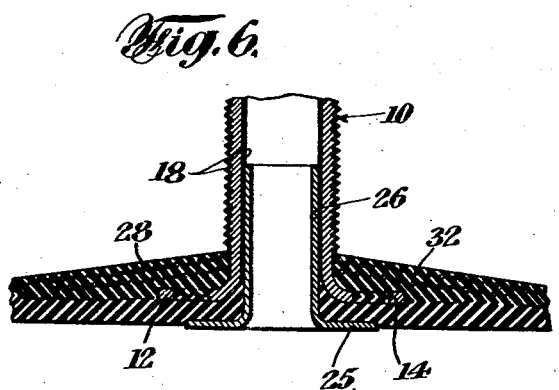
Fig. 6 shows in vertical or longitudinal section a fragment of the finished article comprising valve stem and bushing, and a fragment of the inner tube wall and of the patch all vulcanized and integrated together.

Fig. 6 illustrates the finished article, or rather the valve stem portion of that article resulting from the next steps of the method as follows:

While the inner tube and flanged bushing are supported on the bracket as indicated in Fig. 5, the valve stem such as that shown in Fig. 3 is sleeved over the bushing until the base 12 of the valve stem rests on the wall of the uncured rubber tube 20. Next an uncured rubber patch 28 which may take the form shown in plan in Fig. 7, with a central hole 30 through it, is seated upon the valve stem base and upon the adjacent portions of the rubber tube with the valve stem projecting through the hole in the patch. It will be understood that the patch is preferably made up of a plurality of thin layers of uncured rubber with interleaved fabric layers 32 of graduated areas indicated by the dotted lines in Fig. 7. Only two or three fabric layers are indicated in Figs. 6 and 7, but in practice there will be usually about six fabric layers in accordance with the usual practice for making inner tube patches.

The bushing 26, the inner tube wall 20, the valve stem 10 and the patch 28, having been thus assembled, and while they are supported on the bracket 22, pressure is then applied against the top of the patch to compress all of the parts forcibly together and thereby countersink the flange 26 of the bushing into the uncured rubber wall of the tube and telescope the bushing proper more fully into the valve stem and force the uncured rubber of both the tube and patch into intimate contact and union with each other and with the valve stem base and into and through the apertures 14 in said base so as to become bonded with each other through said apertures.

The still uncured inner tube is then removed from the bracket 22 and its two ends brought together and united to form an endless tube in accordance with well known practice in the art of making inner tubes. Thereupon, also in accordance with well known practice in the manufacture of inner tubes and tires, said tube is then put into a vulcanizing mold from which the valve stem 10 projects. The tube is then inflated by a fluid applied through said valve stem to the requisite pressure and the mold is suitably heated to the requisite temperature to vulcanize the rubber of all of the parts and to integrate the rubber to the embedded base portion of the valve stem and to the flanged bushing. Fig. 6 shows in vertical section the finished vulcanized article or rather a fragment thereof, consisting of the valve stem and bushing and the immediately adjacent portions of the patch and inner tube integrated therewith and with each other.

It will be understood that the bushing 26 has a sufficiently snug telescopic fit with the valve stem and has its flange seated into the wall of the uncured rubber tube so that when said tube is inflated as described in the vulcanizer, the inflating fluid is baffled and prevented by the bushing from forcing an entrance or crevice between the parts whereby complete contact and integration between the parts is maintained during vulcanization and therefore is possessed by the finished article. In other words, the object of the bushing is to hold the wall of the tire tube tightly against the bottom of the base of the valve stem until the rubber is cured onto it. If the wall of the tube is not held tightly against the base at the beginning of the vulcanization process, the pressure fluid is liable to get in between the two and prevent proper adhesion. A further object of the bushing is to properly aline the valve stem with the hole 24 in the wall of the tube.

The coating 16, Fig. 3, when used lends additional tightness to the fit between the bushing and the valve stem.

A modified flanged bushing is shown in Fig. 8 usable with this invention, having apertures 34 through the flange into which uncured rubber from the tube is pressed and interlocked during the described compression step, which additionally serves to maintain the parts in their compressed relationship until the article is put into the vulcanizer and there inflated and vulcanized.

Fig. 9 shows another modification of the bushing wherein the tubular bushing or bushing proper is slightly oval in transverse section so that it is compelled to deform into more or less cylindrical form in entering the bore of the valve stem and becomes frictionally wedged or gripped therein.

Fig. 10 is the same as Fig. 6 except that the contact surface of the bushing is shown roughened or even serrated or toothed at 36 like the shank of a wire nail so as to bite into the coacting surface of the bore of the valve stem which latter also may be roughened.

Fig. 11 is the same as Fig. 6 except that the valve stem base is annularly corrugated at 38. This increases the surface and otherwise improves the bonding effect between said base and the adjacent rubber parts. For the same purpose the base of the valve stem may be roughened in any suitable way as by sand-blasting its surface.

The rubber article with valve stem, bushing and patch assembled and vulcanized substantially as shown and described, is a new article of manufacture wherein the integration or union between the parts is very strong, rugged and leak-proof.

It is understood that numerous modifications may be made in the above to suit practical manufacturing conditions at different tire plants, but the result in any case will be a perfectly homogeneous joint that will not be affected by the aging of the tube. This method of securing the valve stem to the tube or tire lends itself to economical manufacture as it eliminates the nut and bridge washer now commonly used. The cost of securing the valve stem to the tire is also less than that of the usual method because it is done simultaneously with the curing process and at no extra cost.

What I claim is:

1. The new article of manufacture which comprises a rubber tire tube and a valve stem with the base of the valve stem integrated with the rubber tire tube between the wall thereof and a tire-patch and with an outwardly flanged bushing also integrated with the rubber tube with its flange at the inner face of the tube wall and with the bushing projecting through the inflation hole of the rubber tube snugly into the bore of the valve stem.

2. The new article of manufacture which comprises a rubber tire tube and a valve stem with the base of the valve stem integrated with the rubber tire tube between the wall thereof and a tire-patch and with an outwardly flanged bushing also integrated with the rubber tube with its flange at the inner face of the tube wall and with the bushing projecting through the inflation hole of the rubber tube snugly into the bore of the valve stem, and coating material filling the annular space between said bushing and the inside of the valve stem.

3. The new article of manufacture which comprises a rubber tire tube and a valve stem with the base of the valve stem integrated with the rubber tire tube between the wall thereof and a tire-patch and with an outwardly flanged bushing also integrated with the rubber tube with its flange at the inner face of the tube wall and with the bushing projecting through the inflation hole of the rubber tube snugly into the bore of the valve stem, the aforesaid cooperating portions of the valve stem and bushing being out of round relatively to each other whereby the bushing in entering the valve stem must deform in transverse section and thereby increase its frictional hold on the valve stem.

4. In combination an inflatable hollow rubber article having an inflation hole in its wall, a metal valve stem having a base, and a patch, the valve stem being located at said inflation hole with its base located between the wall of the rubber article and the patch which are vulcanized thereto, and baffle means supported within the basal end of the valve stem and completely overlapping the joint between the valve stem base and the rubber article protecting said joint from being opened up by fluid pressure within the article.

LEWIS C. BROECKER.